United States Patent [19]

Bishop et al.

[11] Patent Number: 4,903,164

[45] Date of Patent: Feb. 20, 1990

[54] O-RING/BACK-UP RING SEAL FOR HIGH PRESSURE TRANSDUCERS

[75] Inventors: Robert P. Bishop, Carver; Herman Purut, Attleboro, both of Mass.

[73] Assignee: Texas Instruments Incorporated, Dallas, Tex.

[21] Appl. No.: 366,054

[22] Filed: Jun. 13, 1989

Related U.S. Application Data

[63] Continuation-in-part of Ser. No. 282,185, Dec. 8, 1988.

[51] Int. Cl.$^4$ .......................... H01G 7/00; G01L 9/12
[52] U.S. Cl. ..................................... 361/283; 73/718; 29/25.42
[58] Field of Search ...................... 73/718, 724; 65/43; 361/280, 283; 29/25.42

[56] References Cited

U.S. PATENT DOCUMENTS 4,716,492 12/1987 Charboneau et al. ............. 361/283

Primary Examiner—Donald A. Griffin
Attorney, Agent, or Firm—John A. Haug; James P. McAndrews; Melvin Sharp

[57] ABSTRACT

A pressure transducer having a pressure sensing surface spaced from an interior surface of the transducer housing by a relatively rigid back-up ring which contacts each of the pressure sensing surface, the interior surface of the housing and an interior side wall of the housing. A relatively less rigid O-ring is disposed between the pressure sensing surface and the interior surface of the housing and contacts the back-up ring, the back-up ring and the O-ring providing sealing of the pressure cavity. The O-ring communicates with the fluid entering the housing via an inlet in the housing. Because the output of the pressure sensing element is affected by the loading of the O-ring and back-up ring, and because this loading changes over time, mainly due to cold flow, compression set, etc.), several special procedures are provided during manufacture and before calibration of the transducers to minimize this problem to avoid calibration change (drift) over time, these being conditioning or burning in prior to calibration. This is accomplished by an extended high temperature soak through a series of pressure cycles or overpressure cycles or a combination thereof and permits the back-up ring and the O-ring to be relieved of stresses so that they will be stable over time.

21 Claims, 1 Drawing Sheet

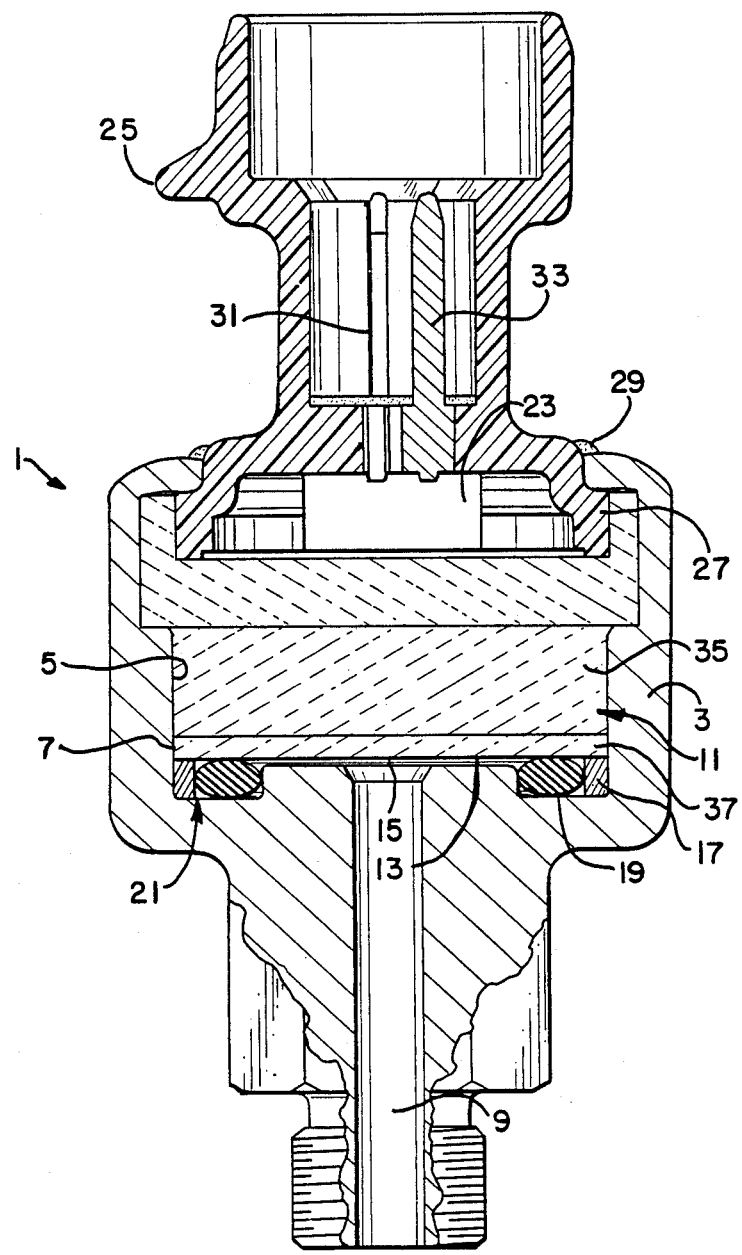

O-RING/BACK-UP RING SEAL FOR HIGH PRESSURE TRANSDUCERS

CROSS REFERENCE TO PRIOR APPLICATIONS

This application is a continuation-in-part of Ser. No. 07/282,185, filed Dec. 8, 1988, the contents of which are incorporated herein in their entirety by reference.

BACKGROUND OF THE INVENTION

1. Field of the Invention

This invention relates to pressure sensors and, more specifically, to a packaging and high pressure sealing system for such pressure sensors.

2. Brief Description of the Prior Art

Pressure sensors containing pressure transducers are well known, typical such systems being described in U.S. Letters Pat. Nos. 4,726,492 and 4,774,626.

Pressure transducers of the prior art have generally been fabricated by providing a pressure sensing module including an electronic circuit having a variable capacitor responsive to fluid pressure. The electronic circuit sensed the capacitance of the capacitor and provided an output through a plastic electrical connector indicative of the sensed pressure. The transducer elements were arranged such that a metal cup assembly having an opening or fluid pressure inlet at one end thereof to receive the fluid under pressure to be measured also included therein the pressure sensing module. The pressure sensing module was spaced from the inlet by a gasket or O-ring, the electronic circuit and connector also being contained within the metal cup. The parts were held together within the metal cup by crimping the metal cup over the plastic connector, the latter being used as a support member.

The above described pressure transducer provided highly satisfactory results when operated in the low to moderate pressure ranges of up to 500 to 600 psi. However, when subjected to pressures at the pressure inlet in the range of about 3000 to 5000 psi and up, the above described pressure transducers tended to fail. There were several points of failure, these being mainly from the inability of the plastic connector to support the high pressures to which it was being subjected. More specifically, the crimp at the metal cup was unable to retain the electrical connector crimped thereunder with the result that the connector was moved out of the cup and caused a failure of the transducer. A further point of failure was the plastic connector itself which tends to shear or compress and release the gasket or O-ring under the high pressure and release the gas under pressure from the interior of the pressure transducer. It is therefore clear that the prior art pressure transducer of the type described hereinabove was incapable of reliable operation in a high pressure environment.

The above described problem of the prior art was materially improved in accordance with the packaging techniques described in the above mentioned Ser. No. 07/282,185, filed Dec. 8, 1988 wherein the pressure sensing element is isolated from the connector by being disposed in an all metal surrounded cavity whereby the plastic connector is separated from the pressure transducer element and is not bearing the loads produced by the high pressure fluid. This is accomplished by a metal member disposed between the pressure sensing element and the plastic connector whereby the high pressures encountered by the pressure transducer are never applied to the plastic connector.

A problem encountered in the embodiments of the above noted application having only a gasket or O-ring is that, under the high pressures encountered, the gasket or O-ring has a tendency to partially extrude between the can and the pressure sensing module due to the tolerance on the diameter of the can and on the pressure sensing element. This causes seal failure and leakage.

In accordance with a second embodiment of the above noted application, an O-ring of resilient material is provided in conjunction with a back-up ring of relatively rigid material in place of the gasket. In this embodiment, the back-up ring has a tendency to partially extrude between the can and sensing element, however it stops its extrusion rapidly and the O-ring now has a closed in area to seal against with no gaps into which it can extrude. This embodiment is further in the form of a face seal wherein the two mating parts, namely a face of the housing and the opposing fluid pressure receiving face of the pressure sensing module create a gland of a controlled volume to prevent formation or existence of any extrusion gaps. In this embodiment, the pressure sensing surface of the pressure transducer package contacts an opposing surface of the housing. Therefore, the pressure sensing element is susceptible to breakage or performance deviations due to loading thereon caused by the force applied thereto by the housing surface adjacent thereto.

The compression or loading of the back-up ring and the O-ring can vary due to part tolerances. In addition, the output of the pressure transducer varies with the loading which the O-ring applies to the sensing element. The loading due to the back-up ring also affects the pressure transducer output. It is therefore necessary to minimize this problem in order to provide continually accurate and repeatable readings.

SUMMARY OF THE INVENTION

In accordance with the present invention, the above noted problems of the prior art are minimized.

Briefly, in accordance with one feature of the present invention, the pressure sensing surface of the pressure sensing element and an interior surface of the housing which communicates with the fluid inlet of the housing are spaced from each other by a relatively rigid back-up ring, preferably of Teflon (polytetrafluoroethylene), which contacts each of the pressure sensing surface, an interior surface of the housing at its point of contact with the pressure sensing element and the interior surface of the housing spaced from and opposing the pressure sensing surface of the pressure sensing element. The back-up ring can be formed of other materials which are rigid, yet have sufficient softness to avoid cracking of the ceramic pressure sensing surface. Nylon is such a material. A relatively less rigid O-ring is disposed between the pressure sensing surface and the interior surface of the housing spaced therefrom and contacts the back-up ring, the back-up ring and the O-ring providing both spacing between the housing and the pressure sensing surface of the pressure sensing element. The O-ring can be formed of any of the well known materials from which O-rings are generally made, such as, for example, neoprene. The O-ring communicates with the fluid entering the housing via the inlet therein and provides both a seal therefor to prevent escape to the exterior as well as maintaining separation between the pressure sensing element and the housing surface opposing the pressure sensing element.

In addition, because the output of the pressure transducer and particularly of the pressure sensing element thereof is affected by the loading of the O-ring and back-up ring, and because this loading changes over time, (mainly due to cold flow, compression set, etc.), several special procedures are provided during building of the transducers to minimize this problem to avoid calibration change (drift) over time. Accordingly, the transducers are conditioned or burned in prior to pressure transducer calibration. This is accomplished by an extended high temperature soak, through a series of pressure cycles or over-pressure cycles or a combination of the two. This allows the stresses in the back-up ring and the O-ring to be relieved to the point where they will be stable over time. The changes in loading are then able to occur before the device is calibrated, this allowing for a transducer that will not drift after calibration.

BRIEF DESCRIPTION OF THE DRAWING

The FIGURE is a cross sectional view of a pressure transducer in accordance with the present invention.

DESCRIPTION OF THE PREFERRED EMBODIMENT

Referring now to the FIGURE, there is shown a pressure transducer 1 of the type disclosed in the above noted pending application. The pressure transducer 1 includes a metal housing 3, preferably formed of steel and having interior side wall 5 and an interior surface 7 substantially normal to the direction of inlet fluid flow. A fluid pressure inlet 9 extends to the interior of the housing 3. A pressure sensing module 11 having a pressure responsive surface 13 is spaced from the surface 7 to form a pressure cavity 15 therebetween. A Teflon back-up ring 17 is disposed against the side wall 5 between the surfaces 7 and 13, abutting all three said surfaces. An O-ring 19 is disposed against the back-up ring 17 within a cavity 21 in the surface 7 and abuts the surfaces 7 and 13 to provide a seal for the pressure cavity 15 as well to maintain the rigid surface 7 spaced from the frangible pressure responsive surface 13.

Electronic circuitry 2 is positioned in contact with the module 11 and is otherwise surrounded by a plastic electrical connector 25 having a flange 27 over which the can or housing 3 is crimped. An environmental seal 29 is positioned at the junction of the housing 3 and the connector 25 to prevent contaminants from travelling between the can and connector to the electronic circuitry 23. Three terminals 31, 33 and one not shown extend outwardly at the rear of the connector and are connected to the electronic circuitry to provide an output therefrom. The pressure sensing module 11 is composed of a pair of ceramic layers 35 and 37 which are spaced from each other, each layer having an electrically conductive coating thereon on opposing surfaces to form a capacitor. The layer 37 receives the force of fluid entering the pressure inlet 5 thereon and, operating as a diaphragm, varies the distance between electrically conductive coatings forming the capacitor to vary the capacitance of the capacitor as a function of applied pressure. A support ring 39, capable of withstanding pressures in the range of up to about 5000 psi is disposed between the pressure sensing module 11 and the electrical connector 25 to isolate the electrical connector and the electronic circuitry 23 from the high pressure applied at the pressure inlet 9. The can 3 is crimped over both the support ring 39 as well as the flange 27 of the connector 25.

The loading of the back-up ring 17 and the O-ring 19 as well as possibly other transducer components can change as a function of time due to loading changes caused by cold flow, compression set and probably other factors. This problem is avoided by conditioning or burning in of all of the elements of the transducer prior to calibration thereof. Such burning in is accomplished by providing to the assembled device, prior to transducer calibration, an extended high temperature soak or a series of pressure cycles or overpressure cycles or a combination of the heat soak and pressure cycling. The high temperature soak is provided by heating the device to the highest temperature that the components comprising the transducer can withstand without degrading. Temperatures in the range of 135 to 150° C. are normally utilized for a period of from about 24 to about 48 or more hours. The pressure cycles are provided by cycling the assembled transducer at pressures from about 0 psi to about 2500 to about 3500 psi, the upper pressure being based upon the pressure rating of the package. Pressure cycling takes place for about 40,000 cycles at a rate of about 1 to 2 Hertz. This permits the stresses in the back-up ring and the O-ring to be relieved to the point where they will be stable as a function of time. The changes in loading occur before the device is calibrated, thereby allowing for a transducer which will not drift after calibration.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

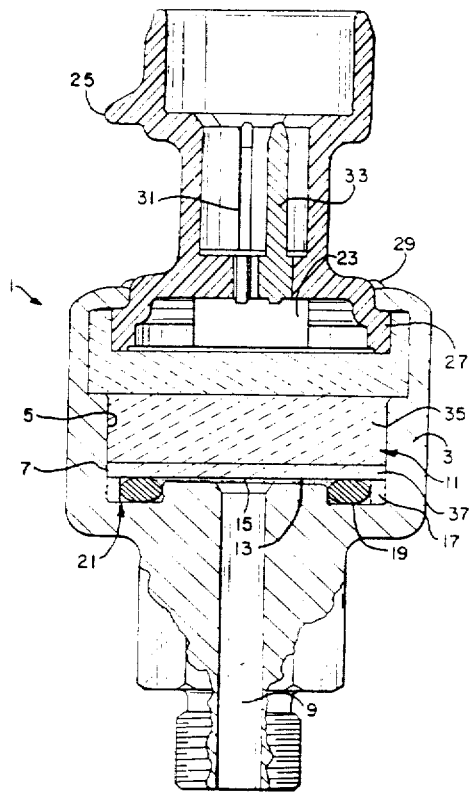

We claim:

1. A pressure transducer which comprises, in combination:
   (a) a housing having a high pressure fluid inlet;
   (b) a pressure sensing element having a pressure responsive surface communicating with said fluid inlet and disposed within said housing to form a pressure cavity with said housing within said housing;
   (c) a relatively rigid member disposed within said pressure cavity and contacting said housing and said pressure responsive surface; and
   (d) a relatively less rigid O-ring contacting said relatively rigid member, said housing and said pressure responsive surface, disposed within said housing and communicating with said fluid inlet to define a surface of said pressure cavity and provide a seal among said rigid member, said housing and said pressure responsive surface;
   (e) said relatively rigid member minimizing extrusion of said seal into gaps caused by the tolerances on the transducer parts.

2. A pressure transducer as set forth in claim 1 wherein said housing further includes an interior surface defining a surface of said pressure cavity, spaced from said pressure responsive surface and communicating with said fluid inlet, said relatively rigid member and said O-ring contacting said interior surface.

3. A pressure transducer as set forth in claim 2 wherein said interior surface is substantially parallel to said pressure responsive surface.

4. A pressure transducer as set forth in claim 3 wherein said rigid member is formed from a material taken from the class consisting of polytetrafluoroethylene and nylon and said O-ring is formed from a relatively softer material.

5. A pressure transducer as set forth in claim 2 wherein said rigid member is formed from a material taken from the class consisting of polytetrafluoroethylene and nylon and said O-ring is formed from a relatively softer material.

6. A pressure transducer as set forth in claim 1 wherein said rigid member is formed from a material taken from the class consisting of polytetrafluoroethylene and nylon and said O-ring is formed from a relatively softer material.

7. A method of making a pressure transducer which comprises the steps of:
 (a) providing a housing having a high pressure fluid inlet;
 (b) providing a pressure sensing element having a pressure responsive surface communicating with said fluid inlet and disposed within said housing;
 (c) providing a relatively rigid member disposed within said housing and contacting said housing and said pressure responsive surface;
 (d) providing a relatively less rigid O-ring contacting said relatively rigid member, said housing and said pressure responsive surface, disposed within said housing and communicating with said fluid inlet; and
 (e) relieving stresses in said rigid member and in said O-ring.

8. The method of claim 7 wherein step (e) includes the step of subjecting said rigid member and said O-ring to an extended high temperature soak.

9. The method of claim 8 wherein step (e) includes the step of subjecting said rigid member and said O-ring to a plurality of pressure cycles.

10. The method of claim 9 wherein said housing includes an interior surface spaced from said pressure responsive surface and communicating with said fluid inlet, said relatively rigid member and said O-ring contacting said interior surface.

11. The method of claim 10 wherein said interior surface is substantially parallel to said pressure responsive surface.

12. The method of claim 9 wherein said soak is at a temperature of from about 135 to about 150° C. for from about 24 to about 48 hours and said pressure cycles are from about zero to about 2500 to about 3500 psi for about forty thousand cycles at a frequency of about two Hertz.

13. The method of claim 8 wherein said housing includes an interior surface spaced from said pressure responsive surface and communicating with said fluid inlet, said relatively rigid member and said O-ring contacting said interior surface.

14. The method of claim 13 wherein said interior surface is substantially parallel to said pressure responsive surface.

15. The method of claim 8 wherein said soak is at a temperature of from about 135 to about 150° C. for from about 24 to about 48 hours.

16. The method of claim 7 wherein step (e) includes the step of subjecting said rigid member and said O-ring to a plurality of pressure cycles.

17. The method of claim 16 wherein said housing includes an interior surface spaced from said pressure responsive surface and communicating with said fluid inlet, said relatively rigid member and said O-ring contacting said interior surface.

18. The method of claim 17 wherein said interior surface is substantially parallel to said pressure responsive surface.

19. The method of claim 16 wherein said pressure cycles are from about zero to about 2500 to about 3500 psi for about forty thousand cycles at a frequency of about two Hertz.

20. The method of claim 7 wherein said housing includes an interior surface spaced from said pressure responsive surface and communicating with said fluid inlet, said relatively rigid member and said O-ring contacting said interior surface.

21. The method of claim 20 wherein said interior surface is substantially parallel to said pressure responsive surface.

* * * * *

UNITED STATES PATENT AND TRADEMARK OFFICE
CERTIFICATE OF CORRECTION

PATENT NO. : 4,903,164
DATED : February 20, 1990
INVENTOR(S) : Robert P. Bishop, Herman Purut It is certified that error appears in the above—identified patent and that said Letters Patent is hereby corrected as shown below:

The title page showing the illustrative figure, should be deleted to appear as per attached title page.

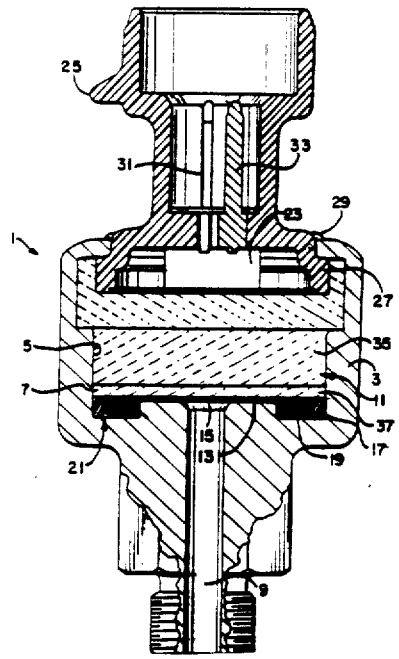

Signed and Sealed this

Tenth Day of September, 1991

Attest:

HARRY F. MANBECK, JR.

Attesting Officer

Commissioner of Patents and Trademarks

United States Patent [19]

Bishop et al.

[11] Patent Number: 4,903,164
[45] Date of Patent: Feb. 20, 1990

[54] O-RING/BACK-UP RING SEAL FOR HIGH PRESSURE TRANSDUCERS

[75] Inventors: Robert P. Bishop, Carver; Herman Purut, Attleboro, both of Mass.

[73] Assignee: Texas Instruments Incorporated, Dallas, Tex.

[21] Appl. No.: 366,054

[22] Filed: Jun. 13, 1989

Related U.S. Application Data

[63] Continuation-in-part of Ser. No. 282,185, Dec. 8, 1988.

[51] Int. Cl.⁴ .......................... H01G 7/00; G01L 9/12
[52] U.S. Cl. ........................ 361/283; 73/718; 29/25.42
[58] Field of Search ............... 73/718, 724; 65/43; 361/280, 283; 29/25.42

[56] References Cited

U.S. PATENT DOCUMENTS 4,716,492 12/1987 Charboneau et al. ............... 361/283

Primary Examiner—Donald A. Griffin
Attorney, Agent, or Firm—John A. Haug; James P. McAndrews; Melvin Sharp

[57] ABSTRACT

A pressure transducer having a pressure sensing surface spaced from an interior surface of the transducer housing by a relatively rigid back-up ring which contacts each of the pressure sensing surface, the interior surface of the housing and an interior side wall of the housing. A relatively less rigid O-ring is disposed between the pressure sensing surface and the interior surface of the housing and contacts the back-up ring, the back-up ring and the O-ring providing sealing of the pressure cavity. The O-ring communicates with the fluid entering the housing via an inlet in the housing. Because the output of the pressure sensing element is affected by the loading of the O-ring and back-up ring, and because this loading changes over time, mainly due to cold flow, compression set, etc.), several special procedures are provided during manufacture and before calibration of the transducers to minimize this problem to avoid calibration change (drift) over time, these being conditioning or burning in prior to calibration. This is accomplished by an extended high temperature soak through a series of pressure cycles or overpressure cycles or a combination thereof and permits the back-up ring and the O-ring to be relieved of stresses so that they will be stable over time.

21 Claims, 1 Drawing Sheet